(12) United States Patent
Ehnert

(10) Patent No.: US 7,163,653 B2
(45) Date of Patent: Jan. 16, 2007

(54) METHOD FOR PRODUCING CERAMIC BRAKE DISKS, WITH AN INSERT IN THE GREEN BODY BEFORE THE PYROLYSIS

(75) Inventor: Gerd Ehnert, Fezensac (FR)

(73) Assignee: Menzolit Fibron GmbH, Bretten (DE)

( * ) Notice: Subject to any disclaimer, the term of this patent is extended or adjusted under 35 U.S.C. 154(b) by 138 days.

(21) Appl. No.: 10/398,736

(22) PCT Filed: Sep. 20, 2001

(86) PCT No.: PCT/EP01/10879

§ 371 (c)(1),
(2), (4) Date: Sep. 11, 2003

(87) PCT Pub. No.: WO02/33285

PCT Pub. Date: Apr. 25, 2002

(65) Prior Publication Data

US 2004/0035658 A1    Feb. 26, 2004

(30) Foreign Application Priority Data

Oct. 18, 2000  (DE) .................. 100 51 808
Aug. 31, 2001  (DE) .................. 101 42 768

(51) Int. Cl.
B29C 45/14   (2006.01)
B29B 11/12   (2006.01)
B29B 1/30    (2006.01)
C04B 35/52   (2006.01)
B28B 5/00    (2006.01)
B28B 3/00    (2006.01)
B28B 7/00    (2006.01)

(52) U.S. Cl. ............... 264/271.1; 264/279.1; 264/259; 264/610

(58) Field of Classification Search ............... 264/264, 264/271.1, 279.1, 154, 129, 629, 635, 641, 264/610, 612; 259/259
See application file for complete search history.

(56) References Cited

U.S. PATENT DOCUMENTS 3,842,029 A * 10/1974 Saito et al. .................. 524/505
4,523,666 A *  6/1985 Murray .................. 188/218 XL (Continued)

FOREIGN PATENT DOCUMENTS

DE    44 38 455    5/1996

(Continued)

*Primary Examiner*—Christina Johnson
*Assistant Examiner*—Matthew J. Daniels
(74) *Attorney, Agent, or Firm*—Antonelli, Terry, Stout and Kraus, LLP.

(57) ABSTRACT

The invention relates to a method for producing ceramic brake disks from a green body consisting of a sheet molding compound (SMC) having reinforcing fibers, and the ensuing pyrolysis and melt infiltration. The aim of the invention is to create a single-element green body comprising very complex inner cavities after pyrolysis. In order to achieve this, the method comprises the following steps: the green body (1) is produced from a sandwich consisting of SMC (2), a thermoplastic insert (4), and SMC (2) in one working step in a tool (5a, 5b), subjected to pressure and temperature; and the insert (4) fills the green body (1) over its entire surface and comprises openings (6) which are arranged in such a way that the upper and lower SMC layers (2) are interconnected, at least in parts.

6 Claims, 7 Drawing Sheets

U.S. PATENT DOCUMENTS

| | | | |
|---|---|---|---|
| 4,786,347 A | * 11/1988 | Angus | 156/172 |
| 5,143,184 A | * 9/1992 | Snyder et al. | 188/218 XL |
| 5,454,990 A | * 10/1995 | Chareire et al. | 264/29.5 |
| 5,830,309 A | * 11/1998 | McCord | 156/307.7 |
| 5,965,658 A | * 10/1999 | Smith et al. | 524/496 |
| 6,042,935 A | * 3/2000 | Krenkel et al. | 428/307.7 |
| 6,086,814 A | * 7/2000 | Krenkel et al. | 264/610 |

FOREIGN PATENT DOCUMENTS

| | | |
|---|---|---|
| DE | 198 34 571 | 2/2000 |
| EP | 0 863 328 | 9/1998 |

\* cited by examiner

Fig. 3
a)
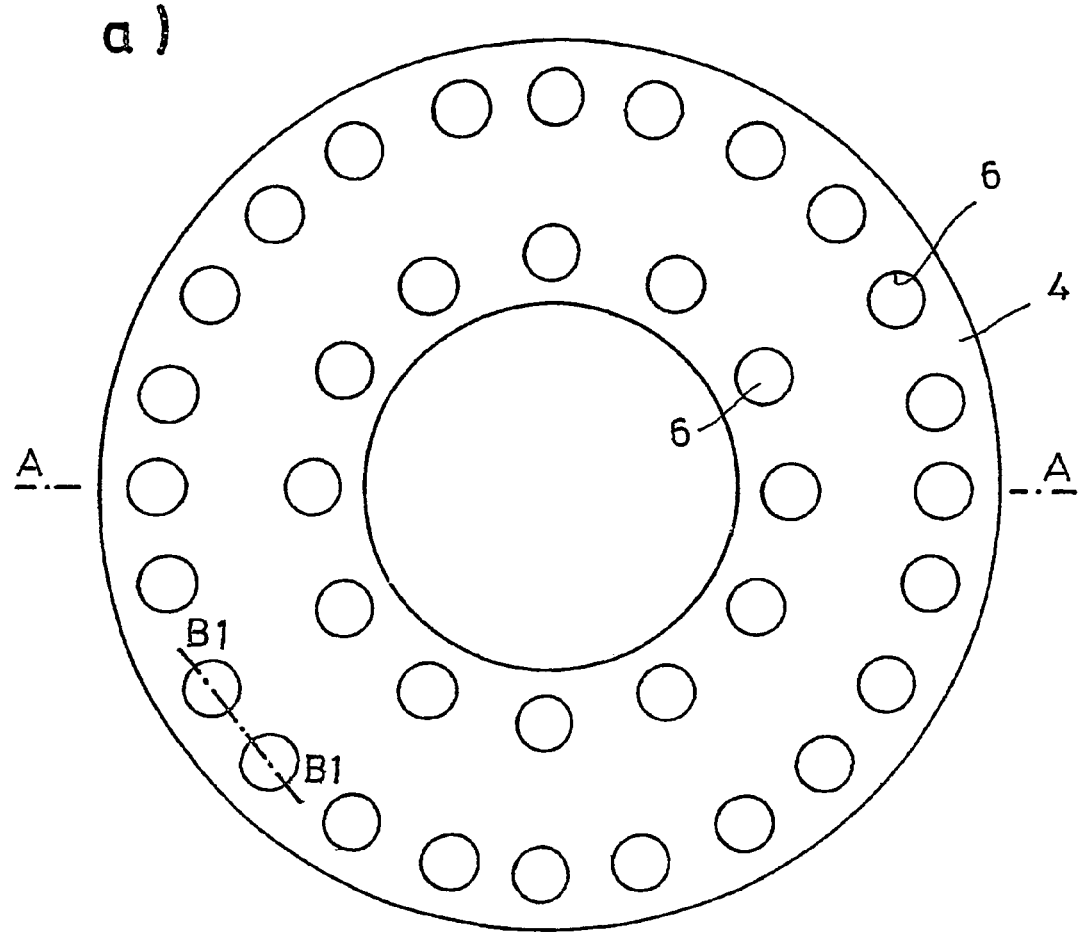
b)

Fig.5
a)
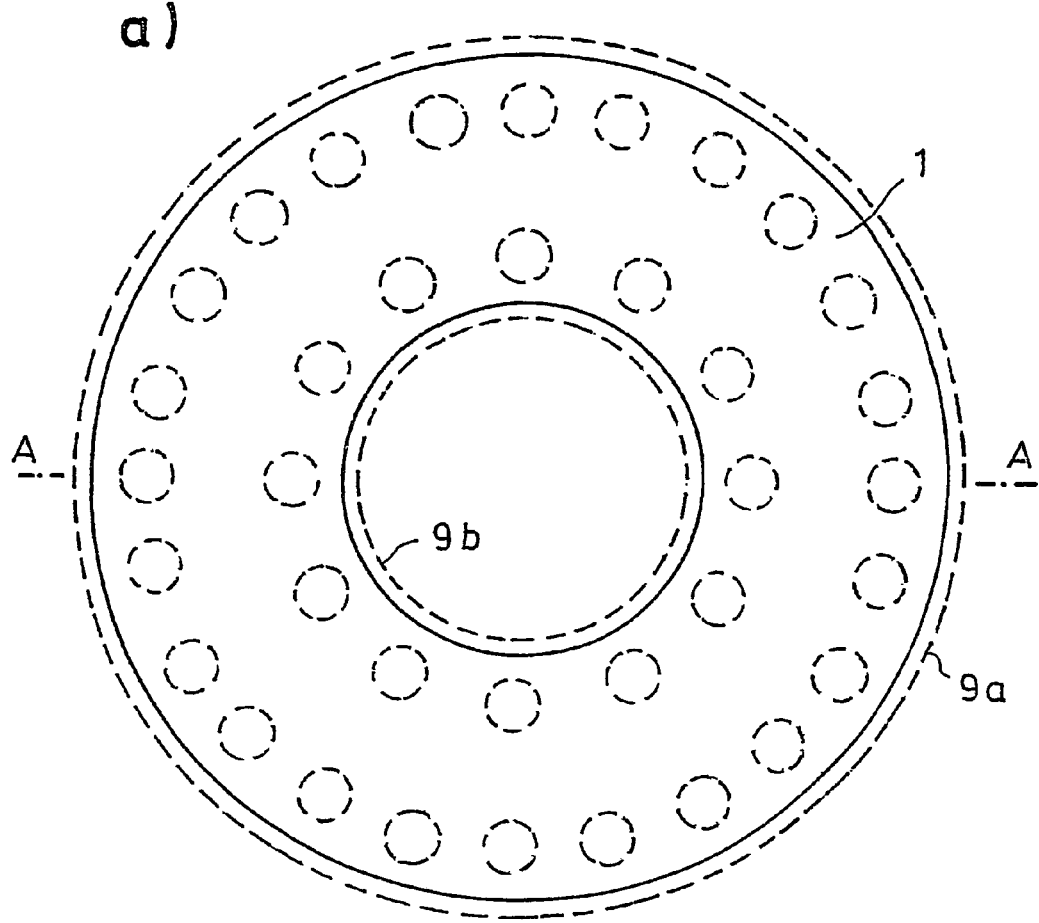
b)
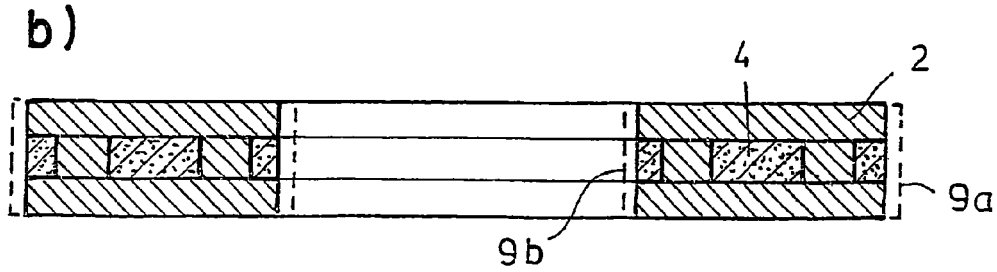

Fig.6
a)
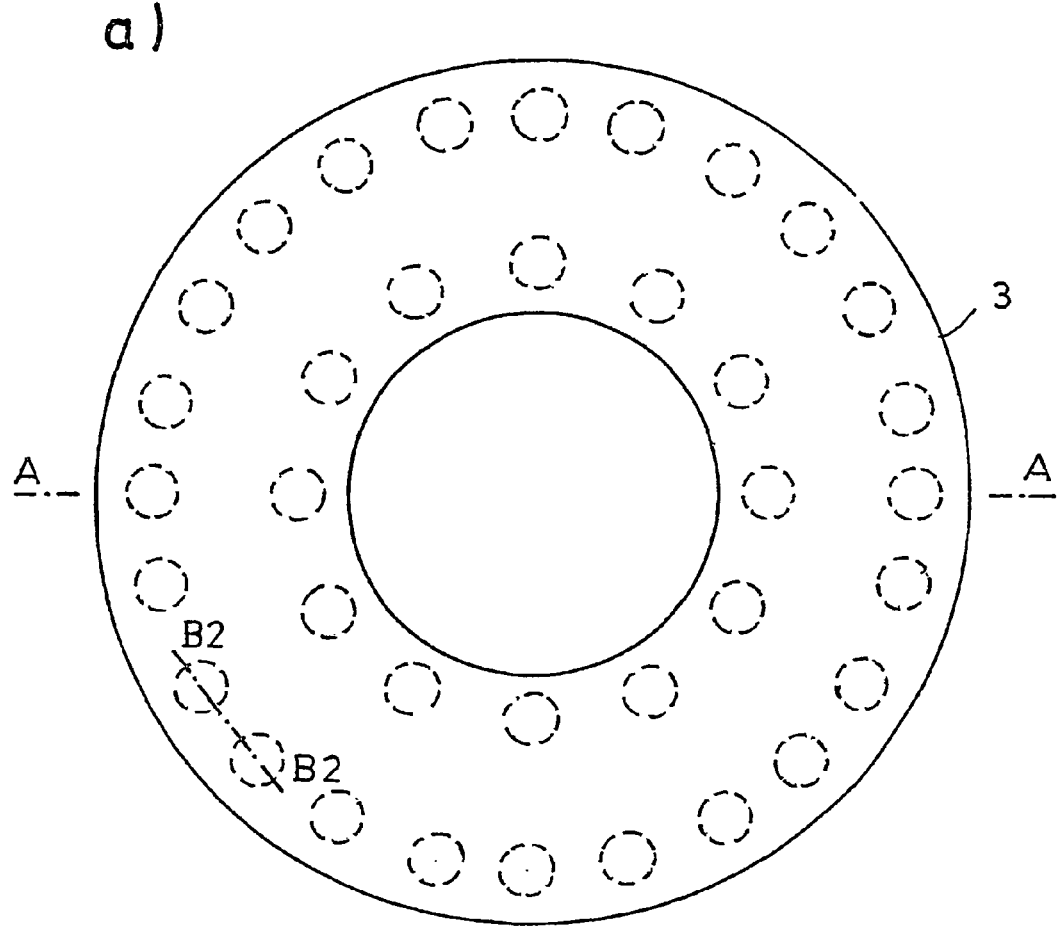
b)
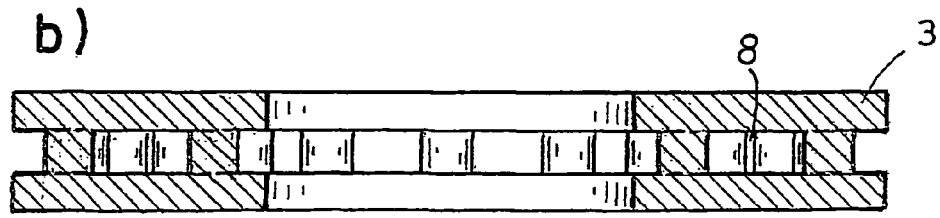

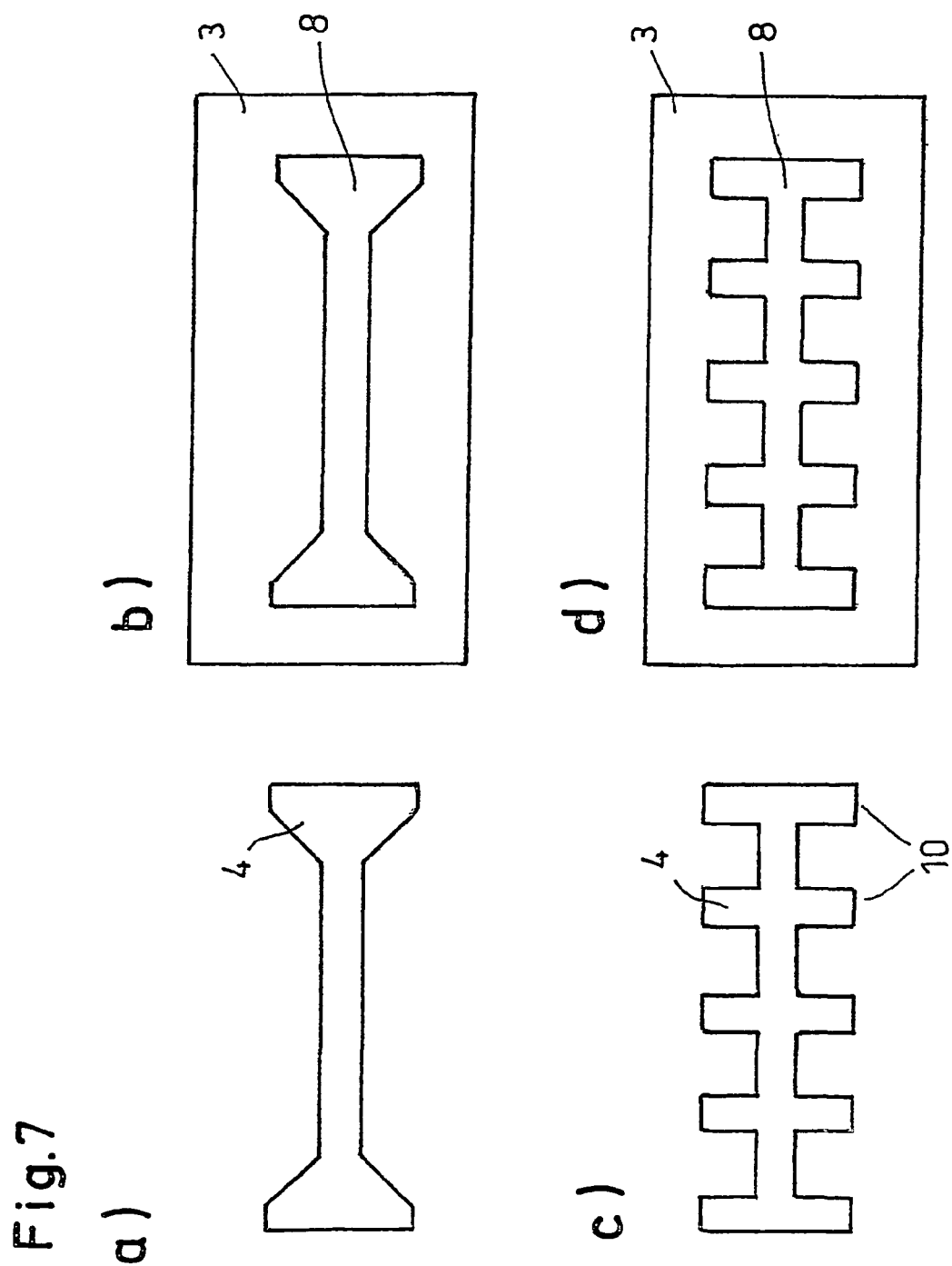

METHOD FOR PRODUCING CERAMIC BRAKE DISKS, WITH AN INSERT IN THE GREEN BODY BEFORE THE PYROLYSIS

BACKGROUND OF THE INVENTION

The invention relates to a process for producing ceramic brake disks.

Such a process is known from PCT/EP00/00253. With this process a green compact is moulded from SMC (sheet moulding compound) with a matrix consisting of synthetic resin and with reinforcing fibres consisting of carbon in a tool subject to the application of pressure and temperature. Subsequently this green compact is pyrolysed for the purpose of producing a porous moulded article. As a further process step, a melt infiltration of the porous moulded article is undertaken with a melt, preferably with a silicon melt, for the purpose of producing a moulded article with reaction-bonded fibres.

With this process the green compact consists of two individual parts which are connected to form one part as a result of the melt infiltration.

From DE 44 38 455 C1 a process for producing ceramic brake disks is known in which the green compact is produced in one piece, and, with a view to creating defined cavities, individual cores are inserted into the green compact prior to pyrolysis.

The object underlying the invention is to specify a process for producing ceramic brake disks with which a one-piece green compact that exhibits very complicated inner cavities after pyrolysis can be produced economically by simple means and as a result of which the ceramic brake disks that are created after the melt infiltration have a lightweight construction.

BRIEF SUMMARY OF THE INVENTION

An important feature of the invention is that SMC with a matrix consisting of phenolic resin is used and contains reinforcing fibres consisting of carbon. The length of these carbon fibres is between 6 mm and endless. From this special SMC a green compact is produced in a tool (press) by application of pressure and temperature.

With a view to creating very complicated cavities in the green compact, a sandwich consisting of SMC, thermoplastic insert and SMC is placed in the tool and is treated in one working step. In this context, 'sandwich' means a layering with a lower layer of SMC and an upper layer of SMC and an insert arranged in between.

According to the invention, this thermoplastic insert fills out the green compact in its entire expanse and at the same time is fashioned by means of apertures in such a way that the upper and lower SMC layers are connected to one another at least in places.

In the course of subsequent pyrolysis of the green compact the insert collapses on itself, so that a one-piece component with very complicated cavities is created.

Subsequently a melt infiltration of this porous moulded article is undertaken with a melt, preferably with a silicon melt, for the purpose of producing a moulded article with reaction-bonded fibres. This moulded article constitutes the actual ceramic brake disk.

In an advantageous embodiment, in the course of production of the green compact the insert is completely flowed around and enclosed by the SMC. In this case it is then necessary for the insert to be exposed on the lateral faces by machining prior to pyrolysis. As a result of this exposure, the gas released in the course of pyrolysis is able to escape.

If desired, additional apertures to the insert can be introduced in the green compact prior to pyrolysis. These apertures may have a round shape or any other shape.

With a view to improving a cooling effect, the surface of the insert may be enlarged by means of projecting cooling fins on the insert. As a result, an enlarged inner surface of the cavity or cavities is created in the green compact after pyrolysis.

In advantageous manner the insert is produced from a high-temperature-resistant thermoplastic—such as, for example, polypropylene, polycarbonate—or from a polyamide.

BRIEF DESCRIPTION OF THE DRAWINGS

Further features of the invention arise out of the Figures which are described below. Shown are.

DETAILED DESCRIPTION OF THE INVENTION

Figure 1:
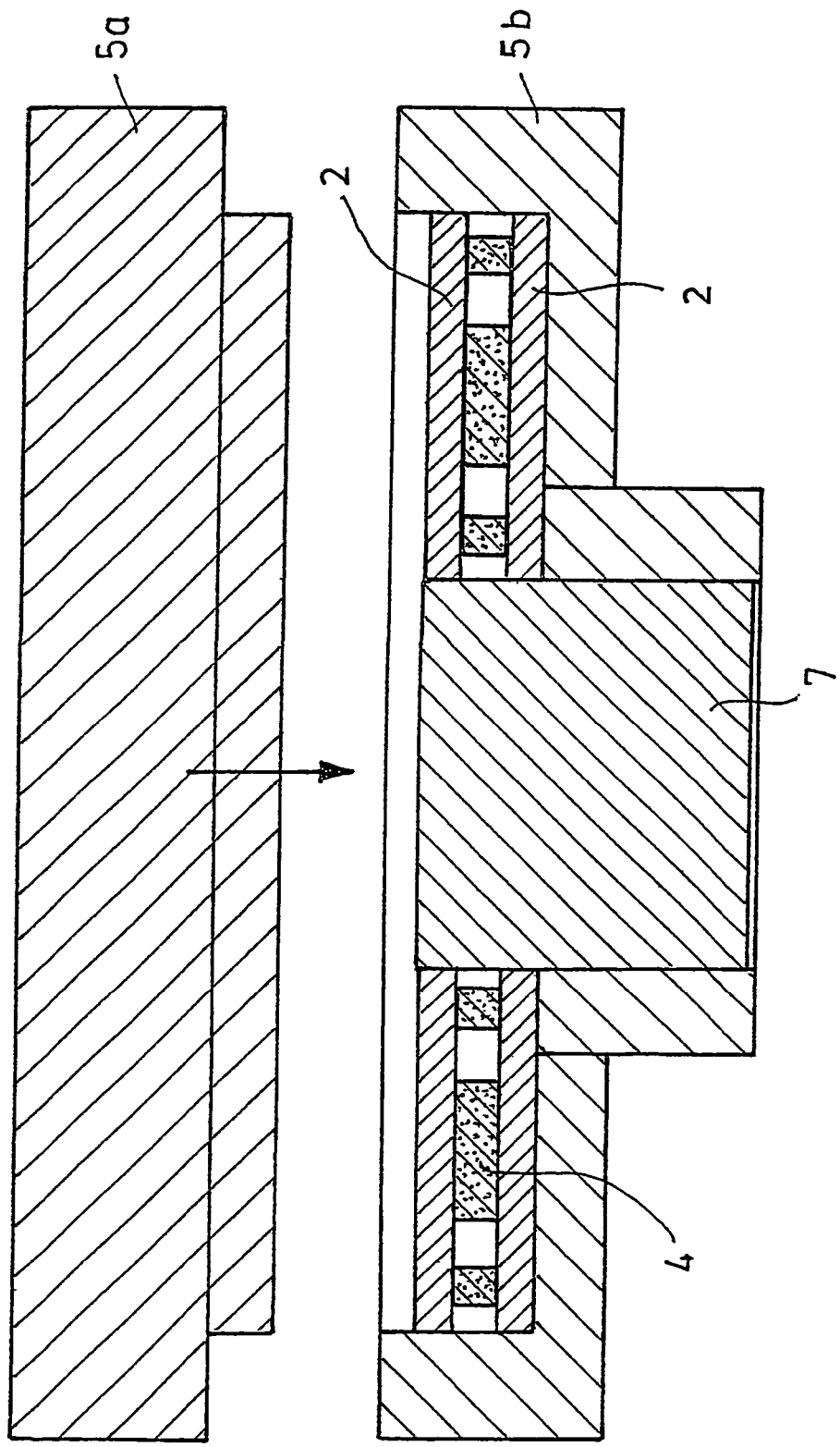
FIG. 1 an open tool (press) for producing a green compact with inserted SMC and insert prior to the pressing operation, FIG. 2 the same tool according to FIG. 1 after the pressing operation, FIGS. 3a, b an insert in two sections, FIGS. 4a, b a green compact prior to pyrolysis and prior to machining, FIGS. 5a, b a green compact prior to pyrolysis and after machining, FIGS. 6a, b a green compact after pyrolysis and FIGS. 7a, b diverse configurations of the insert in the form of sections B—B in FIG. 3.

The following Figures describe the process according to the invention in individual steps. FIG. 1 shows an open tool 5a, 5b for producing a green compact, with an upper part 5a and a lower part 5b, which acts as a press. A sandwich consisting of SMC 2 and insert 4 is placed into the lower part 5b around a male mould 7, an insert 4 being inserted between two layers of SMC 2. This insert 4 is described further below.

The pressing operation takes place, subject to the application of pressure and temperature, by pressing the upper part 5a onto the lower part 5b.

Figure 2:
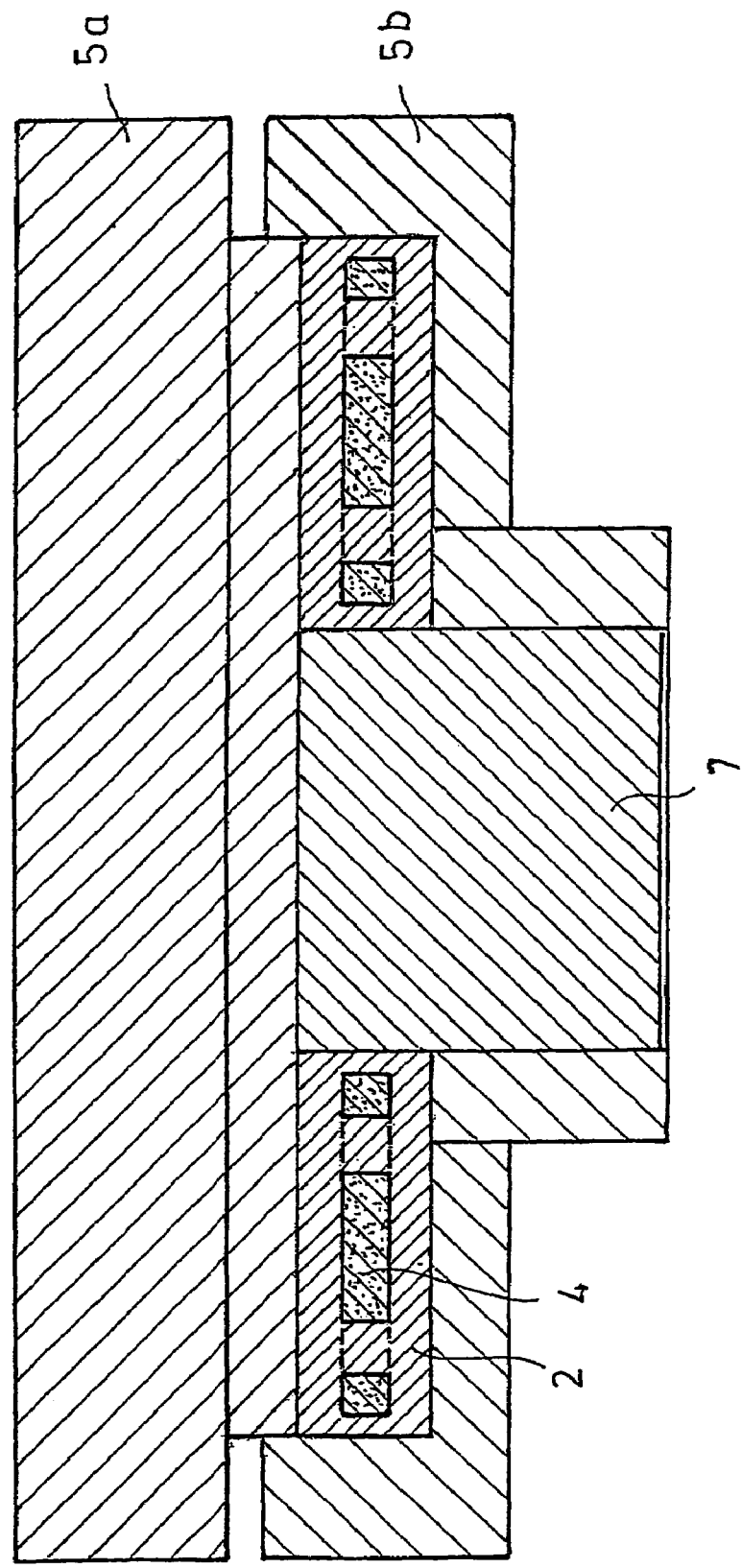

FIG. 2 shows the tool 5a, 5b after the pressing operation. The SMC 2 has liquefied under the application of pressure and temperature and completely surrounds the insert 4. After the hardening process, the green compact is finished and only has to be taken out of the tool 5a, 5b.

FIGS. 3a, 3b show the insert 4 in two sections. The insert 4 is advantageously produced from a polyamide, i.e. it consists of a thermoplastic. It is fashioned in such a way that it fills out the green compact in its entire expanse and at the same time exhibits apertures 6, by virtue of which the lower and upper SMC layers (see FIGS. 1, 2) are connected at least in places.

In the embodiment shown here, the insert 4 contains bores by way of apertures 6 distributed uniformly on two circles arranged concentrically relative to one another around the midpoint of the insert. The inner circle in this case includes 12 apertures 6, and the outer circle includes 24 apertures 6. FIG. 3b shows a section along line A—A in FIG. 3a.

Figure 4:
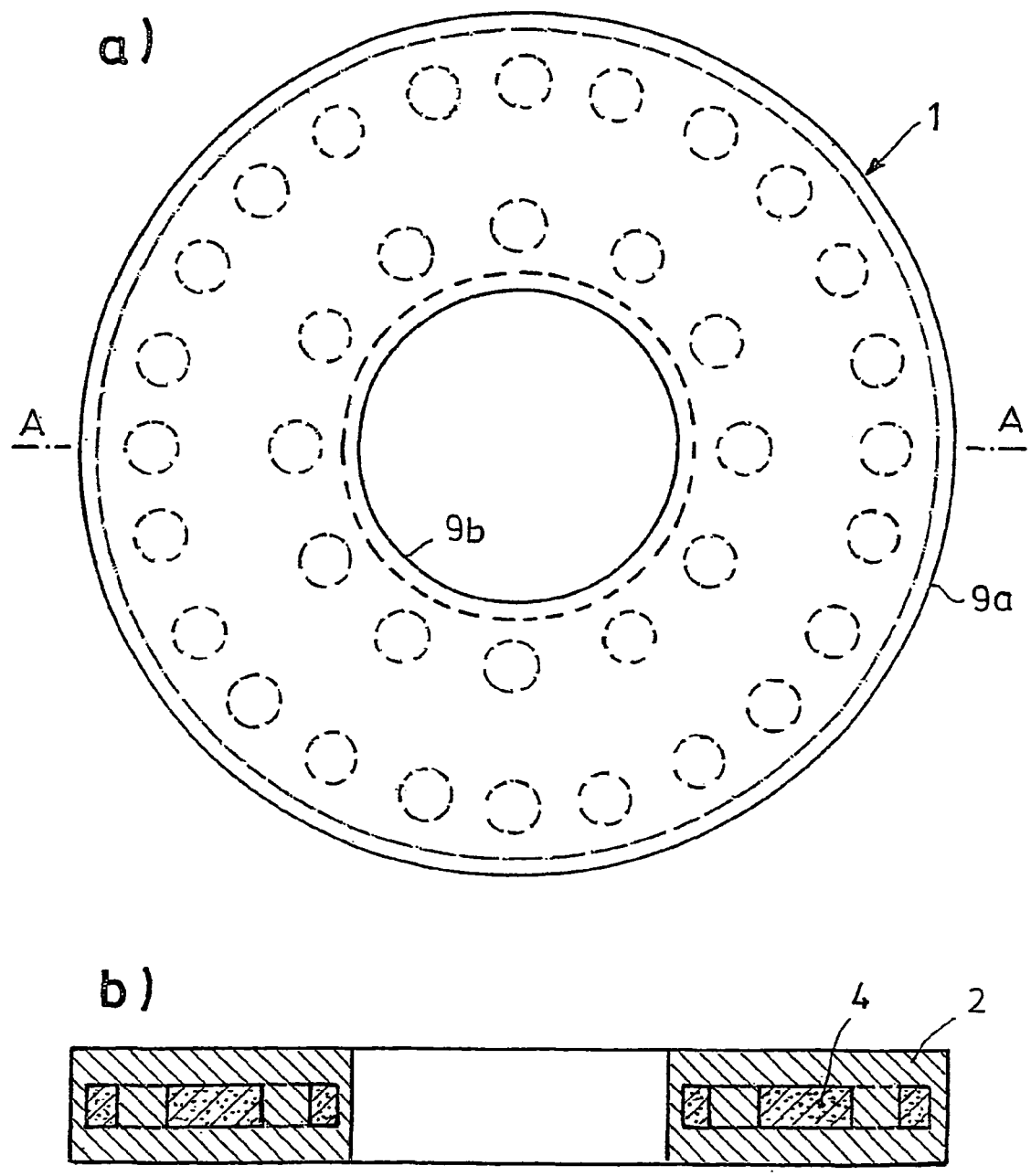

FIGS. 4a, b show a finished green compact 1 prior to pyrolysis, i.e. after the pressing operation, such as is shown in FIGS. 1, 2. FIG. 4b again shows a section along line A—A in FIG. 4a. It can be well discerned that the insert 4 is completely surrounded by the SMC 2.

At this stage, apertures (not shown) to the insert can be introduced through the SMC 2.

In advantageous manner, however, the green compact 1 is machined on the lateral faces 9a, 9b prior to pyrolysis, specifically in such a way that the insert is exposed on the lateral faces 9a, 9b. This has the advantage that no undesirable high pressure is able to arise in the interior of the green compact 1 in the course of pyrolysis.

FIGS. 5a, 5b show the green compact 1 after this machining. The state of the lateral faces 9a, 9b prior to machining is indicated by dashed lines. What is essential in this connection is that the insert 4 is exposed after the machining. FIG. 5b again shows a section along line A—A in FIG. 5a.

FIG. 6 shows the green compact after pyrolysis, i.e. a porous moulded article 3 has now been produced. FIG. 6b again shows a section along line A—A in FIG. 6a. The insert has been completely pyrolysed and has therefore disappeared. At the place where the insert was located in the green compact a cavity or ventilation ducts 8 has/have now arisen. The apertures in the insert are now the points of connection between the upper and lower layers of SMC.

By way of final working step, the porous moulded article 3 is subjected to a melt infiltration with a melt, preferably with a silicon melt, for the purpose of producing a moulded article with reaction-bonded fibres. This moulded article then constitutes the actual brake disk. The external appearance is identical with FIGS. 6a, 6b.

With a view to enlarging the surface area of the ventilation ducts 8, and hence with a view to improving the cooling effect, in advantageous manner the insert exhibits a shape in the region of the apertures that later gives rise to an enlarged surface area in the finished brake disk.

FIGS. 7a, 7c both show, in a section according to line B1—B1 in FIG. 3a, such configurations of the apertures in the insert 4. FIG. 7a shows the shape of a dog's bone, and FIG. 7c a shape with perpendicularly projecting cooling fins 10.

FIGS. 7b, 7d show, in a section according to line B2—B2 in FIG. 6a, the result of these special configurations of the insert 4, i.e. the state after pyrolysis, by virtue of which the ventilation ducts 8 have been formed. The ventilation duct 8 is now arranged in the porous moulded article 3 at the place where the insert 4 was previously located.

The invention claimed is:

1. A process for producing ceramic brake disks, comprising the following process steps:

producing a green compact from a sandwich comprising a lower layer of sheet moulding compound, a round thermoplastic insert having an inner diameter, an outer diameter, and decentered apertures, and an upper layer of sheet moulding compound in a working step in a tool subject to the application of pressure and heat, whereby the insert fills out the green compact substantially over its entire expanse and at the same time the green compact is fashioned by the apertures in such a way that the upper and lower sheet moulding compound layers are connected to one another at least in places at least through the apertures, and the upper and lower sheet moulding compound layers completely flow around and enclose the insert, wherein the upper and lower sheet moulding compound layers comprise a phenolic resin matrix and carbon reinforcing fibers having a length of at least 6 mm;

exposing the inner diameter and outer diameter of the insert by machining; then pyrolysing the green compact for the purpose of producing a porous moulded article; and melt infiltrating the porous moulded article with a melt to produce a moulded article with reaction-bonded fibers.

2. Process according to claim 1, characterised in that prior to pyrolysis additional apertures to the insert are introduced in the green compact.

3. Process according to claim 1, characterised in that projecting cooling fins are arranged on the insert.

4. Process according to claim 1, characterised in that the insert is produced from a thermoplastic or from a polyamide.

5. Process according to claim 1, characterised in that the insert is produced from polypropylene or polycarbonate.

6. Process according to claim 1, characterised in that the melt is a silicon melt.

* * * * *